(12) United States Patent
Ohnishi

(10) Patent No.: US 8,115,674 B2
(45) Date of Patent: Feb. 14, 2012

(54) METHOD OF DETECTING TARGET OBJECT AND TARGET OBJECT DETECTION DEVICE

(75) Inventor: Yoshifumi Ohnishi, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 27 days.

(21) Appl. No.: 12/830,946

(22) Filed: Jul. 6, 2010

(65) Prior Publication Data

US 2011/0001661 A1    Jan. 6, 2011

(30) Foreign Application Priority Data

Jul. 6, 2009    (JP) ................................. 2009-159775

(51) Int. Cl.
*G01S 13/00* (2006.01)
(52) U.S. Cl. .................... 342/202; 342/179; 382/312
(58) Field of Classification Search .............. 342/179, 342/202; 382/312
See application file for complete search history.

(56) References Cited

U.S. PATENT DOCUMENTS

| | | | |
|---|---|---|---|
| 4,725,723 A | 2/1988 | Shimojima | |
| 4,967,066 A | 10/1990 | Beraldin et al. | |
| 2007/0197916 A1* | 8/2007 | Kawagishi et al. | 600/459 |

FOREIGN PATENT DOCUMENTS

| | | | |
|---|---|---|---|
| CN | 2773713 Y | 4/2006 |
| JP | 5-66263 A | 3/1993 |
| JP | 5-264719 A | 10/1993 |
| JP | 9-72955 A | 3/1997 |
| JP | 2000-137071 A | 5/2000 |
| JP | 2008-275331 A | 11/2008 |
| JP | 2010-25906 A | 2/2010 |

* cited by examiner

*Primary Examiner* — Timothy A Brainard
(74) *Attorney, Agent, or Firm* — Birch, Stewart, Kolasch & Birch, LLP

(57) ABSTRACT

This disclosure provides a target object detection device for detecting different areas by different pulse-shaped signals detecting an area from an antenna position to a given distance. The device includes a transmission module for transmitting different pulse-shaped transmission signals at predetermined timings, a reception module for receiving their reflection signals to generate a reception signal, a saturation detection module for comparing a level of each of the reception signals with a predetermined threshold to detect saturation of the reception signal, and an image forming module for forming a detection image based on the reception signals. The transmission module generates an alternative pulse-shaped signal that is different from the transmitted pulse-shaped transmission signal when the saturation detection module detects the saturation of the reception signal. The image forming module replaces the saturated reception signal with a reception signal obtained by using the alternative pulse-shaped signal to form the detection image.

16 Claims, 5 Drawing Sheets

METHOD OF DETECTING TARGET OBJECT AND TARGET OBJECT DETECTION DEVICE

CROSS-REFERENCE TO RELATED APPLICATION(S)

The application claims priority under 35 U.S.C. §119 to Japanese Patent Application No. 2009-159775, which was filed on Jul. 6, 2009, the entire disclosure of which is hereby incorporated by reference.

TECHNICAL FIELD

The present invention relates to a method and device for detecting a target object, such as a radar device, for detecting the target object based on a reception signal acquired by a pulse-shaped transmission signal reflecting on the target object.

BACKGROUND

Conventionally, radar devices, which are one kind of a target object detection device, transmits a pulse signal to a detection area and detects a target object from a reflection signal. In order to improve an S/N of the reception signal and to raise the target object detection performance, the radar device using pulse-compression processing exists for such a radar device.

In the radar device using such a modulated pulse signal, the reception signal may be saturated when amplifying the signal by an LNA (Low Noise Amplifier) if an object with a large reflective cross-sectional area exists within the detection area. If the reception signal is saturated, a peak level of the reception signal will reach the ceiling and, thus, it will be impossible to obtain an accurate target object detection result due to a drop of the S/N. Especially, in the case of the radar device using the pulse-compression processing for transmitting the pulse-shaped transmission signal containing an FM chirp signal (hereinafter, referred to as a "modulated pulse signal"), if the reception signal is saturated, a frequency component ratio of the reception signal and a frequency component ratio of the transmission signal will not be in agreement with each other. Therefore, at the time of the pulse compression, the level of the peak frequency will fall and range side lobes (side lobes on a time axis) will occur.

FIGS. 4A and 4B are views illustrating the generation of the range side lobes of the pulse-compressed signal in the conventional radar device. FIG. 4A is a time chart for showing time-axis waveforms of the transmission signal, the reception signal, and the pulse-compressed signal, and FIG. 4B is a plan view illustrating a fundamental method of detecting the target object.

As shown in FIGS. 4A and 4B, the radar device carried in a ship transmits sequentially and alternately a pulse signal PSn (n is a positive integer) for short distance detection and a pulse signal PMn (n is a positive integer) for middle distance detection via an antenna at a predetermined time interval. In this case, the pulse signal PSn for short distance detection is formed of a non-modulated pulse, and the pulse signal PMn for middle distance detection is formed of a modulated pulse.

Here, as shown in FIG. 4B, if a target object 90 with a large reflective cross-sectional area exists in transmitting directions of the pulse signals PM1 and PM2 for middle distance detection, reception signals RE901, 902 corresponding to the pulse signals PM1 and PM2 are saturated at the time of amplification of the reception signals. Therefore, in the signals REC901, 902 after the pulse compression, range side lobes occur as shown in the hatched parts of FIG. 4A. For this reason, problems in which the S/N is deteriorated or reflection signals from other objects are buried in the range side lobes concerned occur to make it impossible to perform an accurate target object detection.

As a method of avoiding the saturation of the reception signal, various kinds of methods exist, which include the followings:

(1) A method of performing amplitude attenuation in analog for the reception signal (i.e., so-called an STC or Sensitivity Time Control processing);

(2) A method of providing a dual system, as disclosed in JPA 2000-137071, of a transmission system which does not attenuate the reception signal and a transmission system which attenuates the reception signal to improve a dynamic range; and (3) A method of switching between a transmission system which lets the reception signal pass through the LNA and a transmission system which does not let the reception signal pass through the LNA based on detection of the saturation, as disclosed in JPA H09-072955.

However, when the above method (1) is used, a phase changes within one waveform of the reception signal as the amplitude of the reception signal is attenuated. Therefore, if the pulse-compression processing is performed, the range side lobes will occur similar to the case of the above saturation.

When the above method (2) is used, because two or more reception system circuits must be provided, the scale of hardware will be significantly larger. Moreover, an additional dynamic range which can be obtained with such a circuit configuration is small and, thus, the saturation cannot necessarily be controlled sufficiently.

When the above method (3) is used, because the transmission systems are switched therebetween by detecting the saturation, an accurate detection image cannot be obtained for a time period from the detection of saturation to the switching.

SUMMARY

In order to resolve such conditions described above, the present invention provides a method and device for detecting a target object and a pulse radar device that can form an accurate detection image, even if a reception signal is saturated.

According to an aspect of the invention, a target object detection device is provided for detecting different detection areas by different pulse-shaped signals and synthesizing detected information to detect an area from an antenna position to a given distance. The device includes a transmission module for transmitting at least two or more different pulse-shaped transmission signals at predetermined timings, a reception module for receiving a reflection signal of each of the transmitted pulse-shaped transmission signals to generate a reception signal, a saturation detection module for comparing a level of each of the reception signals with a predetermined threshold to detect saturation of the reception signal, and an image forming module for forming a detection image based on the reception signals. The transmission module generates an alternative pulse-shaped signal that is different from the transmitted pulse-shaped transmission signal when the saturation detection module detects the saturation of the reception signal. The image forming module replaces the saturated reception signal with a reception signal obtained by using the alternative pulse-shaped signal to form the detection image.

The transmission module may transmit, as the alternative pulse-shaped signal, a pulse-shaped signal such that the level of the reception signal by the reflection signal from an area where the saturation is detected is not saturated.

The transmission module may transmit two or more different pulse-shaped signals in a preset order. The two or more different pulse-shaped signals may include at least a pulse-shaped signal for short-distance area detection and a pulse-shaped signal for middle-distance area detection. When the pulse-shaped signal for middle-distance area detection is saturated, the pulse-shaped signal for short-distance area detection may be used as the alternative pulse-shaped signal.

The transmission module may use a pulse-shaped signal of a constant carrier frequency as the alternative pulse-shaped signal.

The transmission module may use a pulse-shaped signal of which a carrier frequency changes sequentially and of which an amplitude level of which is limited, as the alternative pulse-shaped signal.

The saturation detection module may detect the saturation only when the pulse-shaped signal is a pulse-shaped signal of which a carrier frequency changes sequentially and of which an amplitude level is limited.

The transmission module may transmit the pulse-shaped transmission signals from a single antenna at the predetermined timings in the form of electric wave signals. The reception module may generate the reception signal by the reflection signal obtained from the single antenna.

According to another aspect of the invention, a method of detecting a target object is provided, for detecting different detection areas by different pulse-shaped signals and synthesizing detected information to detect an area from an antenna position to a given distance. The method includes transmitting at least two or more different pulse-shaped transmission signals at predetermined timings, receiving a reflection signal of each of the transmitted pulse-shaped transmission signals to generate a reception signal, comparing a level of each of the reception signals with a predetermined threshold to detect saturation of the reception signal, and forming a detection image based on the reception signals. An alternative pulse-shaped signal that is different from the transmitted pulse-shaped transmission signal is generated when the saturation of the reception signal is detected. The saturated reception signal is replaced with a reception signal obtained by using the alternative pulse-shaped signal to foam the detection image.

The alternative pulse-shaped signal may be a pulse-shaped signal such that the level of the reception signal by a reflection signal from an area where the saturation is detected is not saturated.

Two or more different pulse-shaped signals may be transmitted in a preset order. The two or more different pulse-shaped signals may include at least a pulse-shaped signal for short-distance area detection and a pulse-shaped signal for middle-distance area detection. The pulse-shaped signal for short-distance area detection may be used as the alternative pulse-shaped signal.

The alternative pulse-shaped signal may be a pulse-shaped signal of a constant carrier frequency.

The alternative pulse-shaped signal may be a pulse-shaped signal of which a carrier frequency changes sequentially and of which an amplitude level is limited.

The saturation may be detected only when the pulse-shaped signal is a pulse-shaped signal of which a carrier frequency changes sequentially and of which an amplitude level is limited.

According to another aspect of the invention, a target object detection device is provided for transmitting two or more different pulse-shaped signals including at least a pulse-shaped transmission signal for short-distance area detection and a pulse-shaped transmission signal for middle-distance area detection to detect each area, and synthesizing detected information to detect an area from an antenna position to a given distance. The device includes a transmission module for transmitting at least the pulse-shaped transmission signal for short-distance area detection and the pulse-shaped transmission signal for middle-distance area detection, a reception module for receiving a reflection signal of each of the transmitted pulse-shaped transmission signals to generate a reception signal, a saturation detection module for comparing a level of each of the reception signals with a predetermined threshold to detect saturation of the reception signal, and an image forming module for forming a detection image based on the reception signals. The image forming module, when the saturation detection module detects the saturation of the reception signal containing the reflection signal of the pulse-shaped transmission signal for middle-distance area detection, uses the reception signal containing the reflection signal of the pulse-shaped transmission signal for short-distance area detection in replacement of the saturated reception signal containing the reflection signal of the pulse-shaped transmission signal for middle-distance area detection.

The transmission module, when the saturation detection module detects the saturation of the reception signal containing the reflection signal of the pulse-shaped transmission signal for middle-distance area detection, may delay a transmission cycle of the pulse-shaped transmission signal for the middle-distance area detection to be transmitted for the next time, rather than a predetermined cycle.

The transmission module, when the saturation detection module detects the saturation of the reception signal containing the reflection signal of the pulse-shaped transmission signal for middle-distance area detection, may extend a reception period after the transmission of the pulse-shaped transmission signal for the short-distance area detection, comparing with the reception period before the saturation is detected.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Several embodiments of a target object detection device according to the invention will be described with reference to the appended drawings.

First Embodiment

Figure 1:
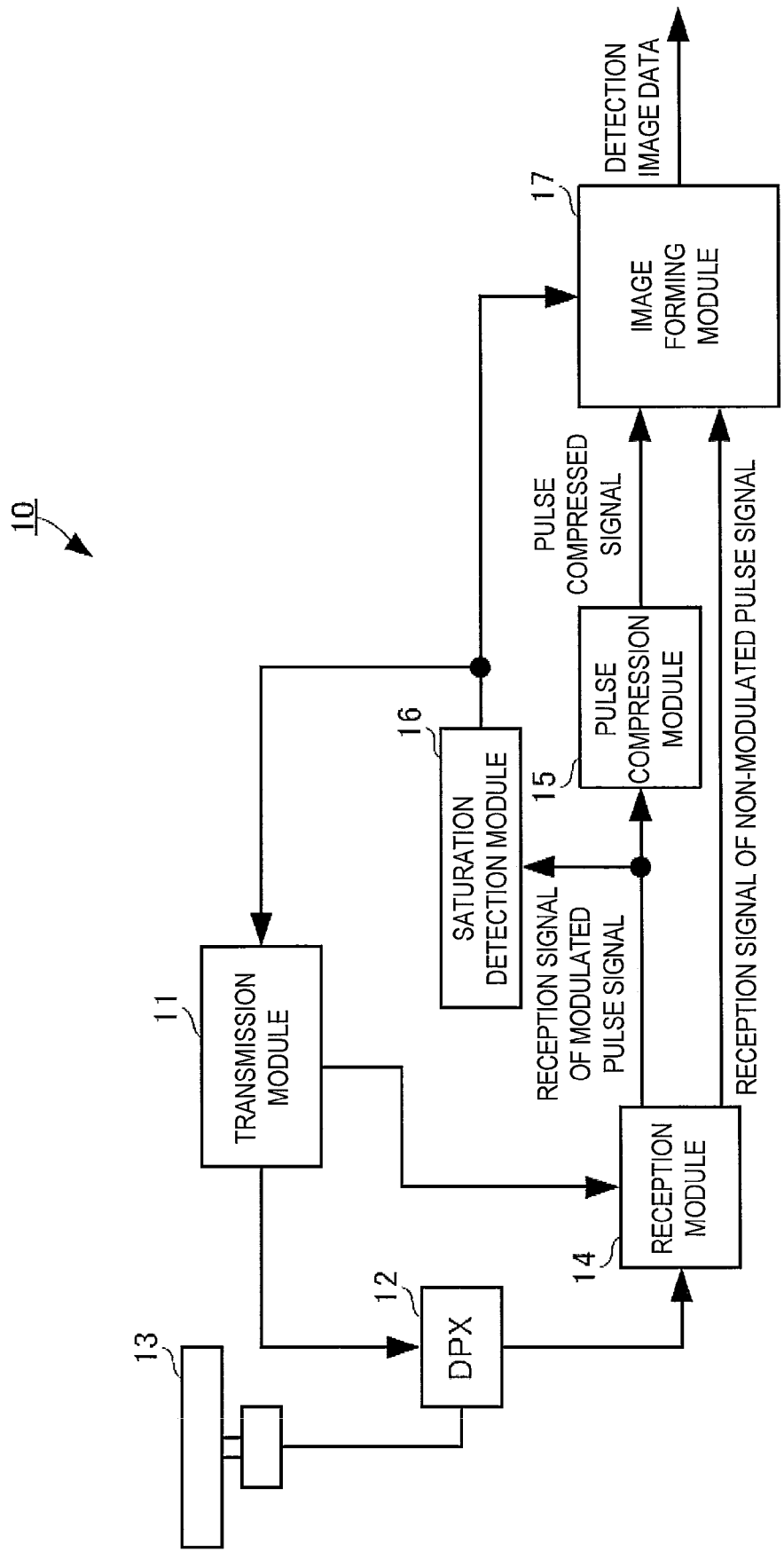
FIG. 1 is a block diagram showing a substantial part of a radar device according to an embodiment of the present invention.

As shown in FIG. 1, the target object detection device illustrated in this embodiment is specifically a pulse radar device 10. However, it may be other devices that detect a target object using a pulse-shaped transmission signal containing a modulated pulse signal.

First, a configuration of the radar device 10 is described. FIG. 1 is a block diagram showing a substantial part of a circuit configuration of the radar device 10.

The radar device 10 includes a transmission module 11, a circulator (DPX) 12, an antenna 13, a reception module 14, a pulse compression module 15, a saturation detection module 16, and an image forming module 17.

Figure 4A:
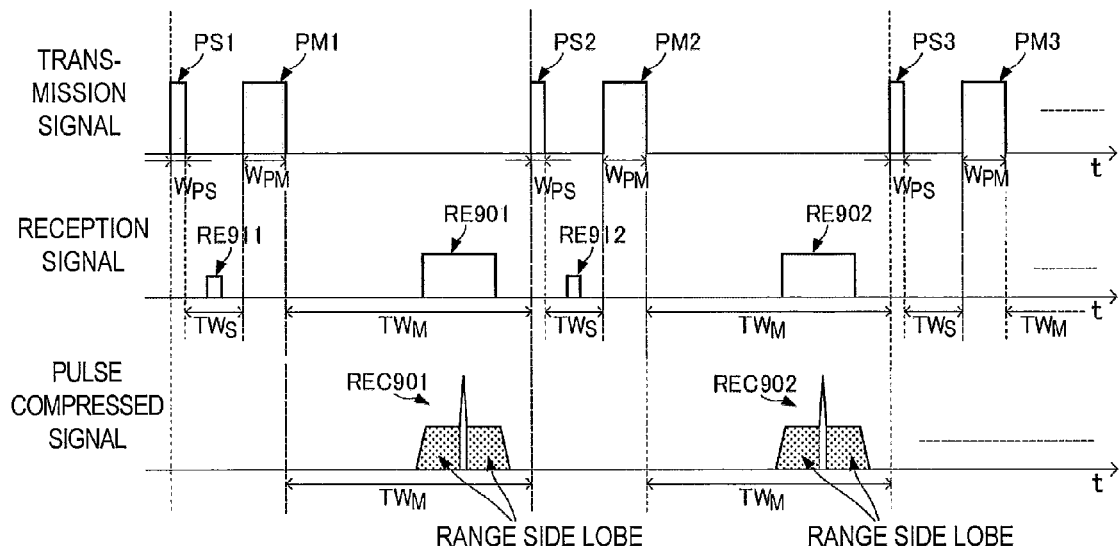
FIGS. 4A and 4B are views illustrating generation of range side lobes of a pulse-compressed signal in a conventional radar device.

The transmission module 11 has one or more oscillation elements made from one or more semiconductors, for example. As already shown in FIG. 4A of related art, the transmission module 11 sequentially transmits sets of a pulse signal PSn (n is a positive integer) for short distance detection and a pulse signal PMn (n is a positive integer) for middle distance detection at a fixed repetition cycle (PRF) during a normal transmission control. Note that the repetition cycle means a time cycle during which one set of the pulse signals is transmitted, where the set of pulses or the pulse group includes one pulse signal PSn for short distance detection and one pulse signal PMn for middle distance detection.

As a flow of the transmitting timings, first, the transmission module 11 transmits a pulse-shaped transmission signal PS1 for short distance detection by a non-modulated pulse signal, for example. After the transmission of the pulse-shaped transmission signal PS1, the transmission module 11 sets and waits for a reception period $TW_S$ for short distance detection by a time length corresponding to a short-distance area. Here, the short-distance area means a predetermined distance range nearby a ship.

Next, the transmission module 11 transmits a pulse-shaped transmission signal PM1 for middle distance detection by a modulated pulse signal after the reception period $TW_S$. The transmission module 11 sets and waits for a reception period $TW_M$ for middle distance detection by a time length corresponding to a middle-distance area after the transmission of the pulse-shaped transmission signal PM1. Here, the middle-distance area means a predetermined distance range more distant than the short-distance area. A first set or group of the pulse transmissions is completed with the pulse-shaped transmission signal PS1 for short distance detection and the pulse-shaped transmission signal PM1 for middle distance detection. Note that, in this embodiment, an example where the reception signals of the short-distance area and the middle-distance area are synthesized to search an area from a position of the antenna 13 to a given distance is described.

Next, after the reception period $TW_M$, similar to the above, the transmission module 11 transmits a pulse-shaped transmission signal PS2 for short distance detection by a non-modulated pulse signal, sets and waits for the reception period $TW_S$, then transmits a pulse-shaped transmission signal PM2 for middle distance detection, and sets and waits for the reception period $TW_M$. A second set or group of the pulse transmissions is completed with the pulse-shaped transmission signal PS2 for short distance detection and the pulse-shaped transmission signal PM2 for middle distance detection. Then, the transmission module 11 sequentially transmits the pulse-shaped transmission signal PSn and the pulse-shaped transmission signal PMn alternately, forming such sets of the pulse transmissions.

Figure 2:
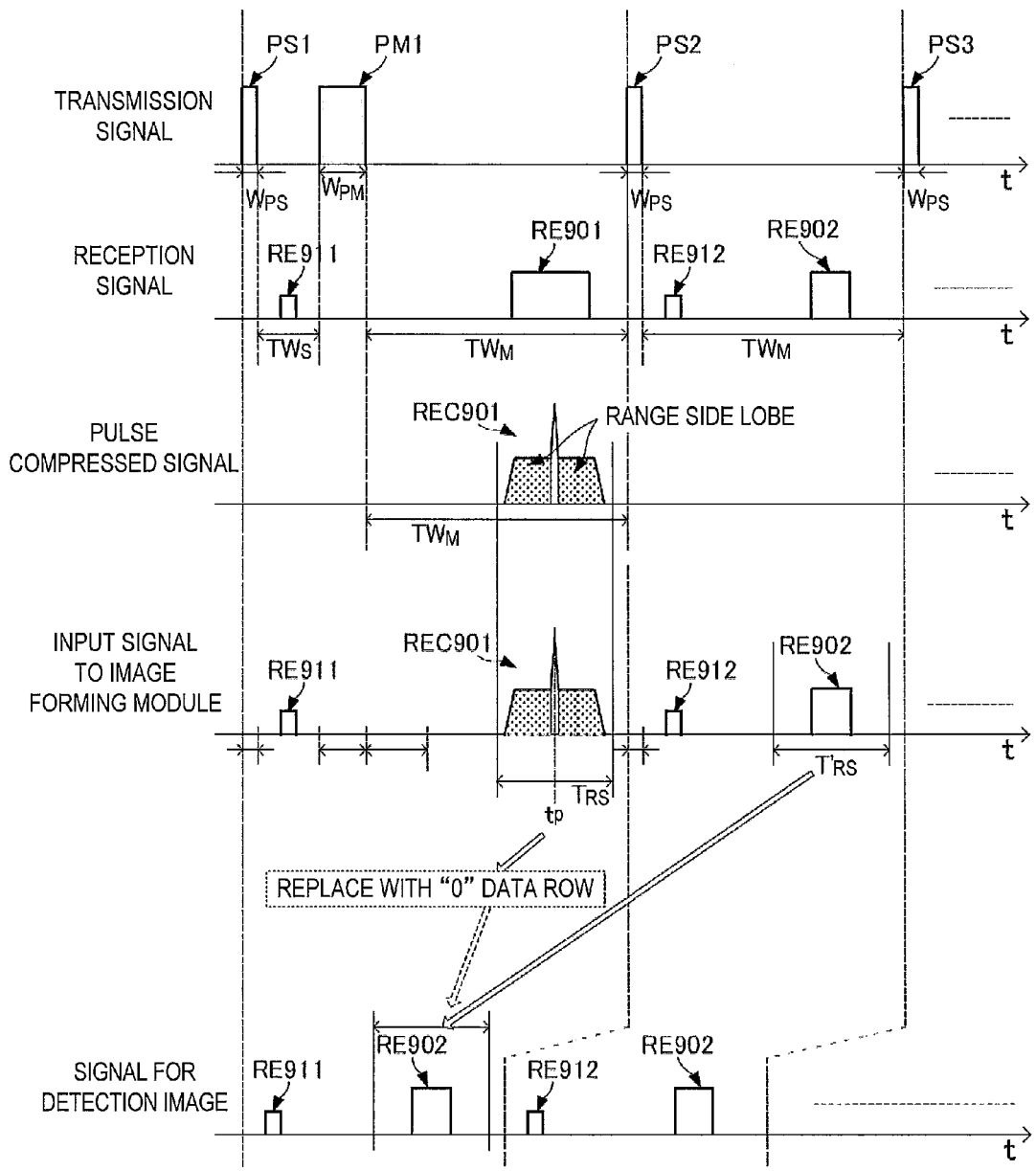
FIG. 2 is a time chart illustrating signal processing of the radar device according to the embodiment.

In addition, when saturation information on the reception signal is acquired from the saturation detection module 16, the transmission module 11 changes a transmission control to a subsequent set of pulse transmissions which is the next set of pulse transmissions including the pulse-shaped transmission signal PMn for which the reception signal concerned is saturated, as shown in FIG. 2. Specifically, the pulse-shaped transmission signal PSn+1 for short distance detection of the set to be changed is transmitted as it is, and the pulse-shaped transmission signal PMn+1 for middle distance detection is not transmitted. Then, the reception period for the pulse-shaped transmission signal PSn+1 for short distance detection is set to the reception period $TW_M$ for middle distance detection. The pulse-shaped transmission signal PSn+1 of the subsequent set corresponds to an "alternative pulse-shaped transmission signal" in the claims.

The circulator 12 transmits each of the pulse-shaped transmission signals from the transmission module 11 to the antenna 13. The antenna 13 emits the supplied pulse-shaped transmission signal to the exterior, while rotating at a predetermined constant speed. During the period where the pulse-shaped transmission signals are not supplied (the reception periods $TW_S$ and $TW_M$ described above), reflection signals are received from the external target object, and the reception signals are outputted to the circulator 12. The circulator 12 then outputs the reception signals from the antenna 13 to the reception module 14.

Note that a relationship between the rotating speed of the antenna 13 and a beam width of the transmission signal is set in advance according to specifications of the radar device or the like. For example, if the target object has a predetermined reflective cross-sectional area at a given distance from the radar device, two or more sequential transmission signals are reflected on the target object.

The reception module 14 is provided with an LNA (Low Noise Amplifier) and amplifies the reception signal to output it. The reception module 14 is given with data related to the transmitting timing from the transmission module 11. Based on the data related to the transmitting timing, if it is the reception signal by a non-modulated pulse signal, the reception module 14 outputs it to the image forming module 16. On the other hand, if it is a modulated pulse signal, the reception module 14 outputs it to the pulse compression module 15.

The pulse compression module 15 is provided with a Fourier transform module, a matched filter, and an inverse Fourier transform module, for example. The pulse compression module 15 carries out pulse compression of the modulated pulse signal from the reception module 14 by a known method, and outputs the pulse-compressed signal to the image forming module 17.

If the saturation of the reception signal amplified by the LNA of the reception module 14 is detected, the saturation detection module 16 outputs the saturation information to the transmission module 11 and the image forming module 17.

If the saturation information from the saturation detection module 16 is not inputted, the image forming module 17 forms detection image data using the reception signal of the non-modulated pulse signal from the reception module 14, and the pulse-compressed signal from the pulse compression module 15. Here, the image forming module 17 may perform known pulse integration processing, if needed. The pulse integration processing is processing in which the reception signals adjacent to each other along the rotating direction of the antenna 13 are integrated. The detection image data outputted from the image forming module 17 is applied with processing including, displaying the data on a display module (not illustrated).

In addition, if the saturation information is inputted, the image forming module 17 replaces the reception signal corresponding to an occurring section of range side lobes of the pulse-compressed signal caused by the saturated reception signal with a reception signal corresponding to an occurring section of the range side lobes of the pulse-shaped transmission signal PSn+1 of the subsequent set. The image forming module 17 then forms an image for the occurring section of the range side lobes based on the replaced reception signal.

Next, with reference to FIG. 2, more specific processing when the saturation occurs in the reception module 14 is described. FIG. 2 is a chart illustrating the signal processing of the radar device of this embodiment. Hereinbelow, a case where a target object 91 with a small reflective cross-sectional area exists in the short distance detection area, and a target object 90 with a large reflective cross-sectional area exists in the middle-distance detection area is described as an example, similar to the case shown in FIG. 4B.

First, the pulse-shaped transmission signal PS1 containing the non-modulated pulse signal is transmitted as the first set of the pulse transmissions, and a reception signal RE911 is then obtained at a timing according to a distance from the radar device to the target object 91 within the reception period $TW_S$. Because this reception signal corresponds to the non-modulated pulse signal, it is inputted into the image forming module 17 and is used for the image formation as it is.

Next, after the reception period $TW_S$ from the completion timing of the transmission of the pulse-shaped transmission signal PS1, the pulse-shaped transmission signal PM1 containing the modulated pulse signal is transmitted, and a reception signal RE901 is then obtained at a timing according to a distance from the radar device to the target object 90 within the reception period $TW_M$. Here, if the reception signal is saturated due to the large reflective cross-sectional area of the target object 90 when the reception signal RE901 is amplified by the reception module 14, the pulse-compressed signal REC901 will have range side lobes, although it has a peak level (refer to the signal waveform at the third row in FIG. 2).

In this case, the saturation detection module 16 has detected the saturation of the reception signal RE901, and the saturation information is inputted into the transmission module 11 and the image forming module 17.

Based on this saturation information, the transmission module 11 sets and waits for the reception period after the transmission of the pulse-shaped transmission signal PS2 for short distance detection of the second set of the pulse transmissions to $TW_M$ for middle distance detection, and suspends the transmission of the pulse-shaped transmission signal PM2.

The image forming module 17 uses the reception signal RE911 of the non-modulated pulse signal for the target object 91 as a signal for a detection image as it is.

When the pulse-compressed signal REC901 for the target object 90 is inputted from the pulse compression module 15, the image forming module 17 detects a timing "$t_p$" at a peak level of the pulse-compressed signal REC901. The image forming module 17 replaces data of a period $T_{RS}$ which is substantially twice as long as a pulse width $W_{PM}$ of the pulse-shaped transmission signal PM1, centering the timing $t_p$ at the peak level of a time axis, with a "0" data row. This is based on the period during which the range side lobes after the pulse compression occurs being substantially twice longer than the pulse width of the transmission signal. Thereby, the period during which the range side lobes occurs can certainly be replaced with the "0" data row.

Next, when the pulse-shaped transmission signal PS2 containing the non-modulated pulse signal is transmitted from the transmission module 11, a reception signal RE912 is obtained at a timing according to the distance from the radar device to the target object 91 within the reception period $TW_M$, and a reception signal RE902 is obtained at a timing according to the distance from the radar device to the target object 90. Because these reception signals correspond to the non-modulated pulse signals, they are inputted into the image foaming module 17 as they are.

The image forming module 17 uses the reception signal RE912 of the non-modulated pulse signal for the target object 91 as a signal for a detection image as it is together with the reception signal RE911.

In addition, the image forming module 17 acquires the reception signal, to be discarded, occurred during a period $T'_{RS}$ corresponding to the period $T_{RS}$ within the reception period $TW_M$ for the pulse-shaped transmission signal PS2 (i.e., the reception signal during the period containing RE902 which is substantially a reflection echo from the target object 90). Then, the image forming module 17 uses the reception signal containing RE902 as a signal for a detection image as it is to compensate the period during which the data is replaced with the "0" data row in the above processing, by the reception signal containing RE902.

By performing such processing, the image formation can be performed without using the signal with which the range side lobes are produced by the pulse compression. Therefore, a fall of an S/N can be prevented due to the generation of the range side lobes, and even if a target object with a small reflective cross-sectional area exists during the period of the range side lobes, the target object can certainly be detected. That is, a target object detection performance can be improved.

In this embodiment, upon the processing, because the reception signal corresponding to the pulse-shaped transmission signal PS2 of the next set to the saturated pulse-shaped transmission signal PM1 is replaced with the reception signal corresponding to the pulse-shaped transmission signal PM1 while transmitting the signal and rotating the antenna. Therefore, it may be thought that an accurate echo cannot be obtained from the target object 90. However, if the transmission signal from the radar device has a beam width as described above, the target object has a large reflective cross-sectional area so as to produce the saturation, and the level of the reception signal is large so as to be saturated, the reception signal of the subsequent set where the saturation occurred can certainly be acquired by reflecting on the same target object 90. Therefore, by using the configuration and processing of this embodiment, the target object 90 with the large reflective cross-sectional area can be detected correctly, and the bad influences by the range side lobes can be prevented.

Although, in this embodiment, the example is described, where the transmission suspend processing of the pulse-shaped transmission signal PMn for middle distance detection is performed only for one set of the pulse transmissions next to the set of the pulse transmissions where the saturation occurred, the processing may also be performed for two or more sets of the pulse transmissions.

Second Embodiment

Next, a radar device according to a second embodiment is described with reference to the appended drawings. A block configuration of the radar device of this embodiment is the same as that of the radar device 10 of the previous embodiment, but processing of the transmission module 11 and the image forming module 17 only differ. Thus, only a necessary part is described.

In this embodiment, if the reception signal is saturated, immediately after the saturated pulse-shaped transmission signal PMn, the transmission module 11 transmits an alternative pulse-shaped transmission signal PM'n containing the non-modulated pulse signal, and sets and waits for the reception period $TW_M$ for middle distance detection to insert it into the normal transmission control processing. Then, the image forming module 17 compensates a period of the pulse-compressed signal of the saturated pulse-shaped transmission signal PM2 with the reception signal of the alternative pulse-shaped transmission signal PM'n.

Figure 3:
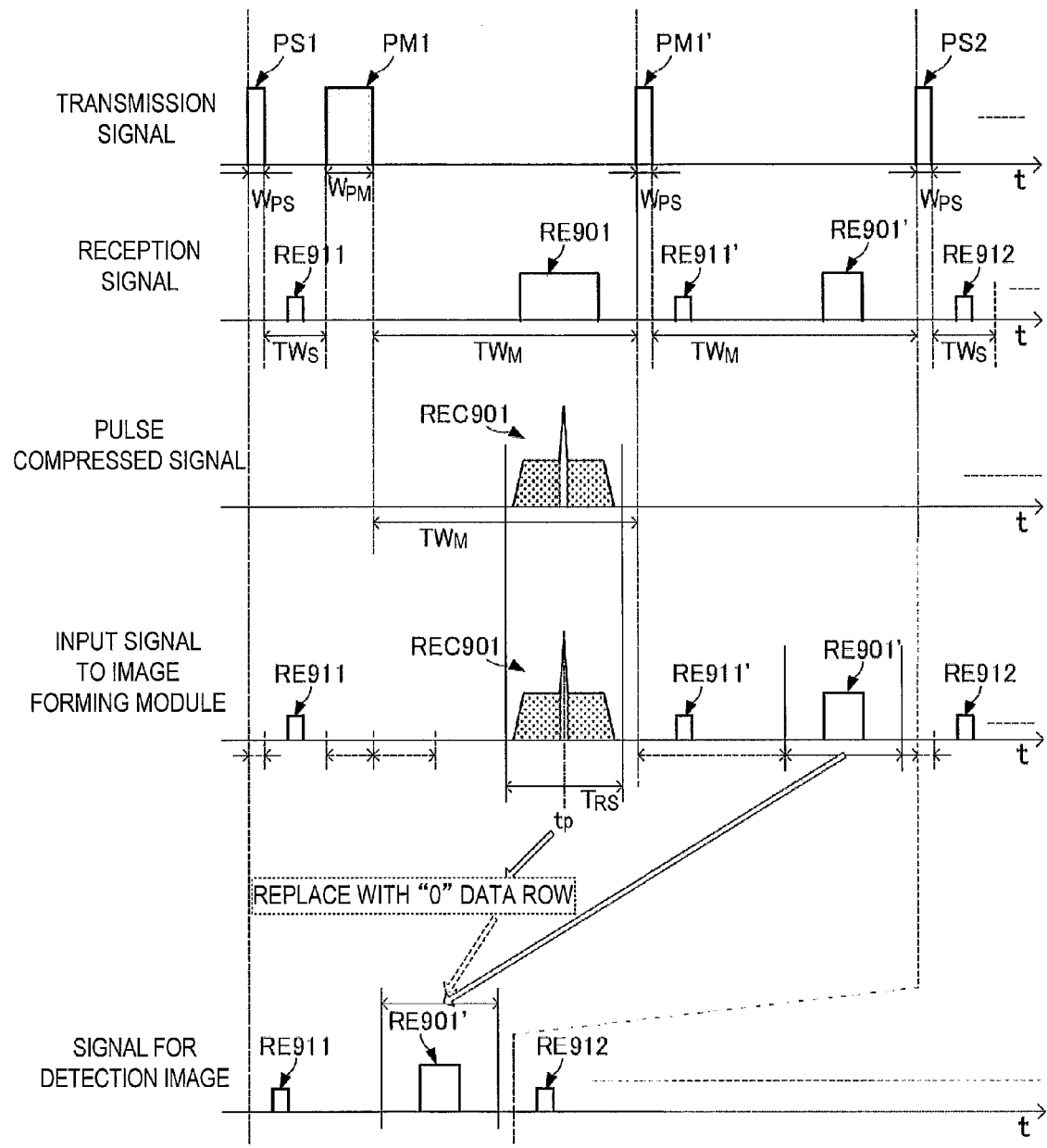
FIG. 3 is a time chart illustrating signal processing of a radar device according to another embodiment
Figure 4B:
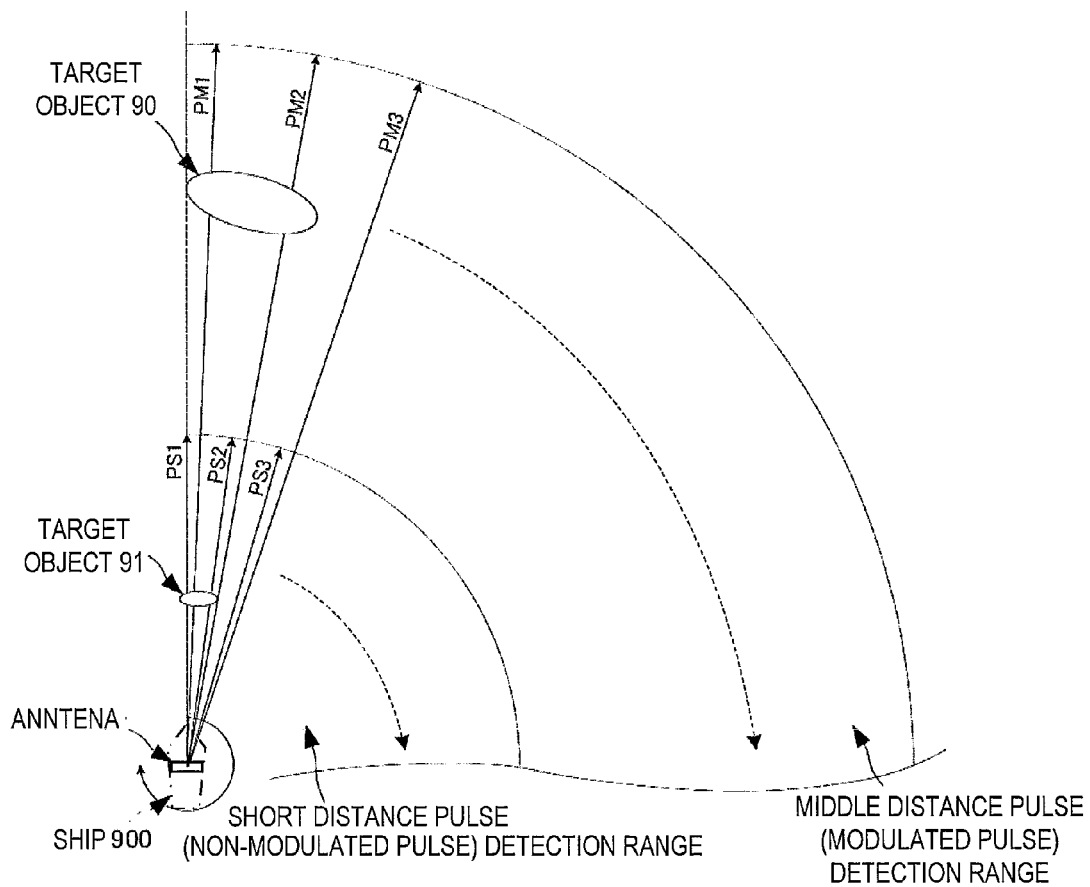

Specifically, processing as shown in FIG. 3 is performed. FIG. 3 is a chart illustrating the signal processing of the radar device of this embodiment. Note that, the following also describes the example, as shown in FIG. 4B, similar to the previous embodiment, where the target object 91 with the small reflective cross-sectional area exists in the short distance detection area and the target object 90 with the large reflective cross-sectional area exists in the middle-distance detection area.

First, as a first set of the pulse transmissions, the pulse-shaped transmission signal PS1 containing the non-modulated pulse signal is transmitted, and the reception signal RE911 is obtained at the timing according to the distance from the radar device to the target object 91 within the reception period $TW_S$. Because this reception signal is for the non-modulated pulse signal, it is inputted into the image forming module 17 as it is to be used for the image formation.

Next, after the reception period $TW_S$ from the completion timing of the transmission of the pulse-shaped transmission signal PS1, the pulse-shaped transmission signal PM1 containing the modulated pulse signal is transmitted, and the reception signal RE901 is then obtained at the timing according to the distance from the radar device to the target object 90 within the reception period $TW_M$. Here, if the reflective cross-sectional area of the target object 90 is large, the reception signal RE901 is saturated when it is amplified by the reception module 14. Thus, the pulse-compressed signal REC901 will have the peak level, but will have the range side lobes (refer to the signal waveform at the third row in FIG. 2).

In this case, the saturation detection module 16 has detected the saturation of the reception signal RE901, and the saturation information is inputted into the transmission module 11 and the image forming module 17.

Based on this saturation information, after the reception period $TW_M$ corresponding to the pulse-shaped transmission signal PM1, the transmission module 11 transmits an alternative pulse-shaped transmission signal PM1' containing the non-modulated pulse, and sets and waits for the reception period $TW_M$ for middle distance detection after the transmission. It is preferred that the alternative pulse-shaped transmission signal PM1' is a signal that has substantially the same distance resolution and S/N ratio to the pulse-compressed signal of the pulse-shaped transmission signal PM1 containing the modulated pulse signal. In this case, according to the saturated pulse-shaped transmission signal, a transmitting electric power and a pulse width of the alternative pulse-shaped transmission signal PM1' containing the non-modulated pulse are suitably set.

The image forming module 17 uses the reception signal RE911 of the non-modulated pulse signal for the target object 91 as a signal for a detection image as it is.

When the pulse-compressed signal REC901 for the target object 90 is inputted from the pulse compression module 15, the image forming module 17 detects the timing "$t_p$" at the peak level of the pulse-compressed signal REC901. In addition, the image forming module 17 replaces the data of the period $T_{RS}$ which is substantially twice as long as the pulse width $W_{PM}$ of the pulse-shaped transmission signal PM1, centering the timing $t_p$ at the peak level of the time-axis, with the "0" data row.

Next, when the alternative pulse-shaped transmission signal PM1' containing the non-modulated pulse signal is transmitted from the transmission module 11, a reception signal RE911' is obtained at the timing according to the distance from the radar device to the target object 91 within the reception period $TW_M$, and a reception signal RE901' is obtained at the timing according to the distance from the radar device to the target object 90.

The image forming module 17 discards the reception signal RE911' of the non-modulated pulse signal for the target object 91, and then acquires a reception signal during a period $T'_{RS}$ corresponding to the period $T_{RS}$ described above (that is, the reception signal during the period containing RE901' which is substantial a reflection echo from the target object 90). Then, the image forming module 17 compensates the period replaced with the "0" data row in the above processing with the reception signal containing RE901'.

Even when such processing is performed, the image formation can be performed without using the signal with which the range side lobes are produced by the pulse compression. Thereby, a similar effect to the first embodiment can be acquired.

In this embodiment, although the number of transmissions of the alternative pulse-shaped transmission signal is set to once when the saturation is detected, the number of transmissions may also be set suitably as needed.

In the first embodiment, when the saturation detection module 16 detects the saturation information of the reception signal RE901 by the pulse-shaped transmission signal PM1 containing the modulated pulse signal, the transmission module 11 sets and waits for, for the second set of the pulse transmissions, the reception period after the transmission of the pulse-shaped transmission signal PS2 for short-distance area detection containing the non-modulated pulse signal to $TW_M$ for middle-distance area detection, and suspends the transmission of the pulse-shaped signal PM2. Further, in the second embodiment, the transmission module 11 transmits the alternative pulse-shaped transmission signal PM1' containing the non-modulated pulse signal after the reception period $TW_M$ for the pulse-shaped transmission signal PM1, and, after this transmission, sets and waits for the reception period $TW_M$ for middle-distance area detection.

Figure 5:
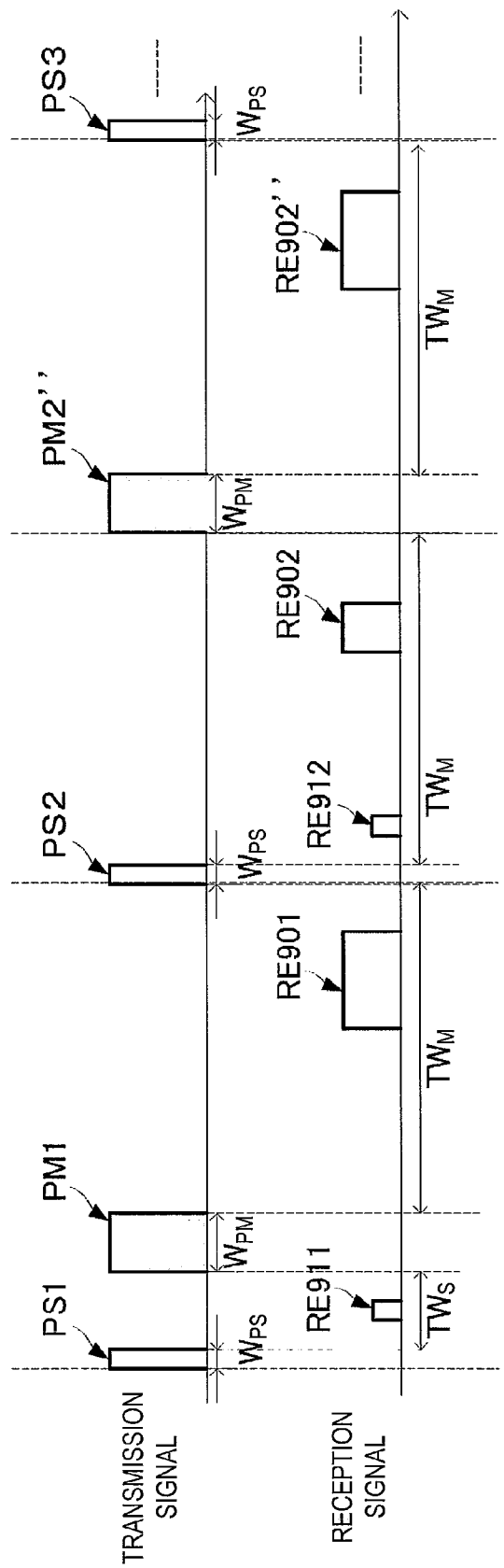
FIG. 5 is a time chart illustrating signal processing of the radar device according to another embodiment.

Here, when the saturation detection module 16 detects the saturation information of the reception signal RE901 by the pulse-shaped transmission signal PM1 containing the modulated pulse signal, as shown in FIG. 5, the transmission module 11, after the lapse of the reception period $TW_M$ from the transmission of the pulse-shaped transmission signal PS2, may transmit a pulse-shaped transmission signal PM2" containing the modulated pulse signal for the next set or group to the saturated pulse-shaped transmission signal PM1. In other words, when the reception signal RE901 is saturated, the reception period after the transmission of the pulse-shaped transmission signal PS2 and the transmission period of the pulse-shaped transmission signal PM2" containing the modulated pulse signal for the next set or group may be extended from $TW_S$ to $TW_M$, for example.

After that, as similar to the above embodiments, the image forming module 17 replaces the reception signal by the pulse-shaped transmission signal PS2 for short-distance area detection with the reception signal of the pulse-shaped transmission signal PM1. Then, the saturation detection module 16 detects whether a reception signal RE902″ by the pulse-shaped transmission signal PM2″ containing the modulated pulse signal is saturated.

If the reception signal RE902″ is saturated like RE901, the transmission module 11 sets and waits for, for the third set of the pulse transmissions, the reception period after the transmission of a pulse-shaped transmission signal PS3 for short-distance area detection containing the non-modulated pulse signal to TW$_M$ for middle-distance area detection. In other words, the reception period of the pulse-shaped transmission signal for short-distance area detection is extended. The image forming module 17 then replaces, similar to the above embodiments, the reception signal by the pulse-shaped transmission signal PS3 for short-distance area detection with the reception signal of the pulse-shaped transmission signal PM2″.

If the reception signal RE902″ is not saturated like RE901, the image forming module 17 uses the reception signal RE902″ and the pulse-compressed signal from the pulse compression module 15 to form the detection image data. Further, the transmission module 11, after the reception period TW$_M$ for middle-distance area detection after the pulse-shaped transmission signal PM2″, transmits the pulse-shaped transmission signal PS3 for short-distance area detection containing the non-modulated pulse signal.

As described above, based on the saturation information of the reception signal by the pulse-shaped transmission signal containing the modulated pulse signal, which is detected by the saturation detection module 16, the transmission module 11 performs processing in which the reception period after the transmission of the pulse-shaped transmission signal for short-distance area detection containing the non-modulated pulse signal to be transmitted later is changed, for example, from TW$_S$ for short-distance area detection to TW$_M$ for middle-distance area detection. Therefore, the image forming can be performed without using the signal where the range side lobes occurred due to the pulse compression. In other words, based on the saturation information of the reception signal detected by the saturation detection module 16, the transmission module controls the transmission period of the pulse-shaped transmission signal for middle-distance area detection or the reception period after the transmission of the pulse-shaped transmission signal for short-distance area detection, thereby exerting similar effects to the embodiments described above.

In the above, as a simple example, the processing of changing the reception period after the transmission of the pulse-shaped transmission signal for short-distance area detection containing the non-modulated pulse signal to be transmitted later, from TW$_S$ for short-distance area detection to TW$_M$ for middle-distance area detection, with reference to FIG. 5. However, without limiting to this, the transmission period of the pulse-shaped transmission signal for middle-distance area detection or the reception period after the transmission of the pulse-shaped transmission signal for short-distance area detection may be changed arbitrary according to a position of the target object which causes the saturation.

Further, in the embodiments, although the example is described where the non-modulated pulse signal as the alternative pulse-shaped transmission signal, it may be a modulated pulse signal where the transmitting electric power is lowered more than the pulse-shaped transmission signal PMn. In this case, for example, if the transmitting electric power is set such that the reception signal is not saturated even when a target object with the realistically largest reflective cross-sectional area exists in a boundary between the short-distance detection area and the middle-distance detection area, the problems of related arts will not occur. However, with this setting, the transmitting electric power may possibly be lowered more than needed. Therefore, for example, after the reflective cross-sectional area of the target object is grasped by using the non-modulated pulse signal, the modulated pulse signal may be transmitted with a transmitting electric power according to the grasped reflective cross-sectional area.

Meanwhile, if the above non-modulated pulse signal is used, because the pulse-compression processing is not performed, the reception signal can still be acquired without requiring the complicated setting processing of the transmitting electric power like the case where the alternative pulse-shaped transmission signal is set to contain the modulated pulse signal. This is because the echo of the target object 90 can be obtained independently on the time-axis and the range side lobes will not occur when the non-modulated pulse signal is contained even if the non-modulated pulse signal is saturated.

In the above description, the example is described, where the set of the pulse transmissions is configured with two kinds of pulse-shaped transmission signals of the pulse-shaped transmission signal PSn for short distance detection and the pulse-shaped transmission signal PMn for middle distance detection. However, in the second embodiment, the above effect can also be obtained, if the entire detection area is divided into three or more distance ranges to perform processing to use two or more kinds of pulse-shaped transmission signals for each range.

Further, in the above embodiments, although the radar device 10 is described as an example of the target object detection device, the above configurations are similarly applicable even if it is other than the radar device. For example, the target object detection device may also be applicable to a sonar or a fish finder that transmits a pulse-shaped ultrasonic signal from an ultrasonic transducer and receives a reflection signal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A target object detection device for detecting different detection areas by different pulse-shaped signals and synthesizing detected information to detect an area from an antenna position to a given distance, comprising:
   a transmission module for transmitting at least two or more different pulse-shaped transmission signals at predetermined timings;
   a reception module for receiving a reflection signal of each of the transmitted pulse-shaped transmission signals to generate a reception signal;
   a saturation detection module for comparing a level of each of the reception signals with a predetermined threshold to detect saturation of the reception signal; and
   an image foaming module for forming a detection image based on the reception signals;
   wherein the transmission module generates an alternative pulse-shaped signal that is different from the transmitted pulse-shaped transmission signal when the saturation detection module detects the saturation of the reception signal, and
   the image forming module replaces the saturated reception signal with a reception signal obtained by using the alternative pulse-shaped signal to form the detection image.

2. The target object detection device of claim 1, wherein the transmission module transmits, as the alternative pulse-shaped signal, a pulse-shaped signal such that the level of the reception signal by the reflection signal from an area where the saturation is detected is not saturated.

3. The target object detection device of claim 1, wherein the transmission module transmits two or more different pulse-shaped signals in a preset order, the two or more different pulse-shaped signals including at least a pulse-shaped signal for short-distance area detection and a pulse-shaped signal for middle-distance area detection, and
   when the pulse-shaped signal for middle-distance area detection is saturated, the pulse-shaped signal for short-distance area detection is used as the alternative pulse-shaped signal.

4. The target object detection device of claim 1, wherein the transmission module uses a pulse-shaped signal of a constant carrier frequency as the alternative pulse-shaped signal.

5. The target object detection device of claim 1, wherein the transmission module uses a pulse-shaped signal of which a carrier frequency changes sequentially and of which an amplitude level of which is limited, as the alternative pulse-shaped signal.

6. The target object detection device of claim 1, wherein the saturation detection module detects the saturation only when the pulse-shaped signal is a pulse-shaped signal of which a carrier frequency changes sequentially and of which an amplitude level is limited.

7. The target object detection device of claim 1, wherein the transmission module transmits the pulse-shaped transmission signals from a single antenna at the predetermined timings in the foam of electric wave signals, and
   the reception module generates the reception signal by the reflection signal obtained from the single antenna.

8. A method of detecting a target object, for detecting different detection areas by different pulse-shaped signals and synthesizing detected information to detect an area from an antenna position to a given distance, comprising:
   transmitting at least two or more different pulse-shaped transmission signals at predetermined timings;
   receiving a reflection signal of each of the transmitted pulse-shaped transmission signals to generate a reception signal;
   comparing a level of each of the reception signals with a predetermined threshold to detect saturation of the reception signal; and
   forming a detection image based on the reception signals;
   wherein an alternative pulse-shaped signal that is different from the transmitted pulse-shaped transmission signal is generated when the saturation of the reception signal is detected, and
   the saturated reception signal is replaced with a reception signal obtained by using the alternative pulse-shaped signal to form the detection image.

9. The method of claim 8, wherein the alternative pulse-shaped signal is a pulse-shaped signal such that the level of the reception signal by a reflection signal from an area where the saturation is detected is not saturated.

10. The method of claim 8, wherein two or more different pulse-shaped signals are transmitted in a preset order, the two or more different pulse-shaped signals including at least a pulse-shaped signal for short-distance area detection and a pulse-shaped signal for middle-distance area detection, and the pulse-shaped signal for short-distance area detection is used as the alternative pulse-shaped signal.

11. The method of claim 8, wherein the alternative pulse-shaped signal is a pulse-shaped signal of a constant carrier frequency.

12. The method of claim 8, wherein the alternative pulse-shaped signal is a pulse-shaped signal of which a carrier frequency changes sequentially and of which an amplitude level is limited.

13. The method of claim 8, wherein the saturation is detected only when the pulse-shaped signal is a pulse-shaped signal of which a carrier frequency changes sequentially and of which an amplitude level is limited.

14. A target object detection device for transmitting two or more different pulse-shaped signals including at least a pulse-shaped transmission signal for short-distance area detection and a pulse-shaped transmission signal for middle-distance area detection to detect each area, and synthesizing detected information to detect an area from an antenna position to a given distance, comprising:
   a transmission module for transmitting at least the pulse-shaped transmission signal for short-distance area detection and the pulse-shaped transmission signal for middle-distance area detection;
   a reception module for receiving a reflection signal of each of the transmitted pulse-shaped transmission signals to generate a reception signal;

a saturation detection module for comparing a level of each of the reception signals with a predetermined threshold to detect saturation of the reception signal; and an image forming module for forming a detection image based on the reception signals;

wherein the image forming module, when the saturation detection module detects the saturation of the reception signal containing the reflection signal of the pulse-shaped transmission signal for middle-distance area detection, uses the reception signal containing the reflection signal of the pulse-shaped transmission signal for short-distance area detection in replacement of the saturated reception signal containing the reflection signal of the pulse-shaped transmission signal for middle-distance area detection.

15. The target object detection device of claim 14, wherein the transmission module, when the saturation detection module detects the saturation of the reception signal containing the reflection signal of the pulse-shaped transmission signal for middle-distance area detection, delays a transmission cycle of the pulse-shaped transmission signal for the middle-distance area detection to be transmitted for the next time, rather than a predetermined cycle.

16. The target object detection device of claim 14, wherein the transmission module, when the saturation detection module detects the saturation of the reception signal containing the reflection signal of the pulse-shaped transmission signal for middle-distance area detection, extends a reception period after the transmission of the pulse-shaped transmission signal for the short-distance area detection, comparing with the reception period before the saturation is detected.

* * * * *